ns Patent [19]

Hogan

[11] 4,133,027
[45] Jan. 2, 1979

[54] PROCESS CONTROL SYSTEM WITH BACKUP PROCESS CONTROLLER

[75] Inventor: James A. Hogan, Hatfield, Pa.

[73] Assignee: Honeywell Inc., Minneapolis, Minn.

[21] Appl. No.: 832,880

[22] Filed: Sep. 13, 1977

[51] Int. Cl.² .................. G06F 15/46; G06F 11/00
[52] U.S. Cl. .......................... 364/119; 235/303.3; 364/200
[58] Field of Search ............ 364/100, 101, 102, 119, 364/200, 900; 235/303.3, 303.4

[56] References Cited
U.S. PATENT DOCUMENTS

| 3,303,474 | 2/1967 | Moore et al. | 235/303.3 X |
| 3,377,623 | 4/1968 | Reut et al. | 364/100 X |
| 3,444,528 | 5/1969 | Lovell et al. | 235/303.3 X |
| 3,636,331 | 1/1972 | Amrehn | 235/303.3 X |
| 3,786,433 | 1/1974 | Notley et al. | 235/303.3 X |

Primary Examiner—Joseph F. Ruggiero
Attorney, Agent, or Firm—Laurence J. Marhoefer; Lockwood D. Burton; Mitchell J. Halista

[57] ABSTRACT

A process control system having a plurality of process controllers each connected to a data highway to receive and send process control data is controlled by a backup director receiving input signals from each of the plurality of process controllers to sense the operability thereof. A backup controller is also connected to the data highway and has its highway address controlled by the backup director in response to a failure of one of the regular process controllers whereby the backup controller is directed by the backup director to assume the address of the failed controller. The data highway interface circuits of the failed controller are concurrently disabled whereby the backup controller provides a substitute for the full operation of the failed controller.

9 Claims, 2 Drawing Figures

PROCESS CONTROL SYSTEM WITH BACKUP PROCESS CONTROLLER

BACKGROUND OF THE INVENTION

1. Field Of The Invention

The present invention relates to process control apparatus. More specifically, the present invention is directed to a process control apparatus having a backup process controller.

2. Description Of The Prior Art

The use of process controllers to control the functioning of an industrial process is well-known in the art and involves the monitoring and adjustment of many critical process variables. In order to improve the reliability of the operation of such process controllers inasmuch as the failure of an on-line industrial process controller could produce a catastrophic effect in the monitored and controlled industrial process, it is desirable to provide a means for counteracting the failure of a process controller as quickly as possible. While a manual substitution by an operator of a known good controller for a failed controller will quickly effect a repair, such a substitution is often impractical owing to the remote location of many industrial process controllers which are generally located at the site of the industrial process being monitored and controlled rather than in a convenient centralized location. Further, in many continuous industrial processes it is desirable to maintain the operation of the industrial process rather than effecting a shut-down following a detection of a failed process controller. Finally, the contemporary use of digital computer apparatus and techniques in the process control field involves the use of digital communication systems to the process controllers as well as digital output signals from the process controllers to the digital communication system. Thus, the digital controller must respond to a digital identification, or communication, signal as well as providing digital process control and monitoring information to the digital communication system. Accordingly, a substituted process controller must be prepared to assume all of the functions of the failed controller as well as being responsive to the communication system digital address code for the failed controller.

SUMMARY OF THE INVENTION

An object of the present invention is to provide an improved process control system having a fully substitutable backup controller.

A further object of the present invention is to provide an improved process control system having a backup process controller capable of assuming an address code of a failed process controller.

In accomplishing these and other objects, there has been provided, in accordance with the present invention, a process control system having a plurality of primary process controllers arranged to receive and send digital data onto a data highway. A backup director is also connected to the data highway and to the process controllers to sense the failure of a primary process controller. The backup director, upon the sensing of a failure of a primary process controller, transfers the address of the failed controller into a backup controller which is connected to the data highway and concurrently disconnects the failed controller from the data highway. The address transfer into the backup controller enables the backup controller to receive and send digital signals onto the data highway as a substitute for the failed controller.

BRIEF DESCRIPTION OF THE DRAWINGS

A better understanding of the present invention may be had when the following detailed description is read in connection with the accompanying drawings, in which.

DESCRIPTION OF THE PREFERRED EMBODIMENT

Figure 1:
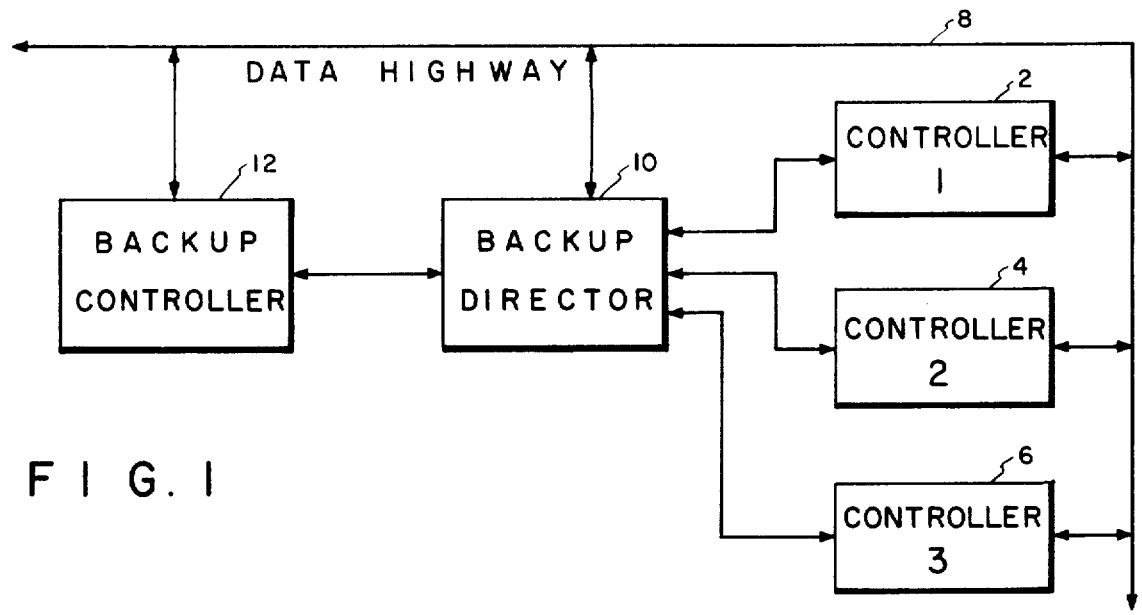
FIG. 1 is a block diagram of a process control system embodying the present invention.

Referring to FIG. 1 in more detail, there is shown a block diagram of a process control system embodying the present invention and including a plurality of conventional process controllers 2, 4 and 6 arranged as primary, or regular, controllers to send and receive digital signals from a data highway 8. Such process controllers are well-known in the art and may include a digital processor, or digital computer, having a program and data memory and a data highway interface circuit including a characterized address circuit whereby a controller can be selectively addressed over the data highway 8. The conventional address circuit includes an array of electrical circuits interconnected by electrical jumpers which are manually manipulated to initially provide each controller with a unique highway address. The prior art highway interface may include further digital logic circuits for sensing a highway address from the data highway 8 and for transferring data between the digital processor and the data highway 8. The process controllers 2, 4, and 6 are connected to the industrial process being controlled by any suitable means (not shown) to provide control operations for the industrial process by receiving analog process signals, performing analog to digital conversions and vice versa, operating on the digital data in accord with programs stored in the processor memory and receiving and transmitting digital data on the data highway 8. These operations are well-known in the art and no further discussion thereof is believed to be necessary. A backup director 10 is connected to each of the process controllers 2, 4, and 6 to sense the operation thereof. A suitable circuit for the backup director 10 is shown in FIG. 2 and described more fully hereinafter.

A backup process controller 12 is connected to the data highway 8 and to the backup director 10. The backup controller 12 is similar to the primary controllers 2, 4, and 6 and is interchangeable therewith to avoid the necessity for having two types of controllers. However, the electrical jumpers for the highway address in the backup controller 12 are replaced with a multi-pin connector (not shown) and a multi-wire cable 26 providing individual connections from the jumper panel to a relay, or switch, matrix, as described hereinafter. Thus, the selective operation of the relays in the matrix is effective to connect the jumper panel to an address memory in the backup director wherein a plurality of jumper panels with respective jumper arrangements or highway addresses are provided. Thus, the jumper pattern in the address memory selected by the relay matrix is connected back to the jumper panel in the backup controller 12 to provide a highway address as if jumpers had been inserted in the jumper panel in the backup controller 12. The backup director 10, is, thus, arranged to insert the highway address of a failed primary controller into the backup controller 12, as is described hereinafter. In other words, the backup controller 12 is normally not provided with a highway address in its highway address circuit whereby the highway address signals on a data highway 8 are effective to produce a response from the primary process controllers 2, 4, and 6 which have been initially provided with coresponding addresses in their respective highway address circuits.

Upon a failure of a primary process controller, i.e., controllers 2, 4, and 6, the backup director 10 is arranged to sense such a failure by monitoring the operation of the primary controllers 2, 4, and 6 and to insert the highway address of the failed controller into the backup controller 12. Also, the process input and output connections of the failed controller are disconnected and the process connections applied to the backup controller 12. Further, following such a controller failure, the highway address interface of the backup controller 12 is enabled by the backup director 10 while the highway interface circuit of the failed controller is disabled to effectively disconnect the failed controller from the data highway 8 whereby the backup controller 12 functions as a full substitute for the failed controller.

Figure 2:
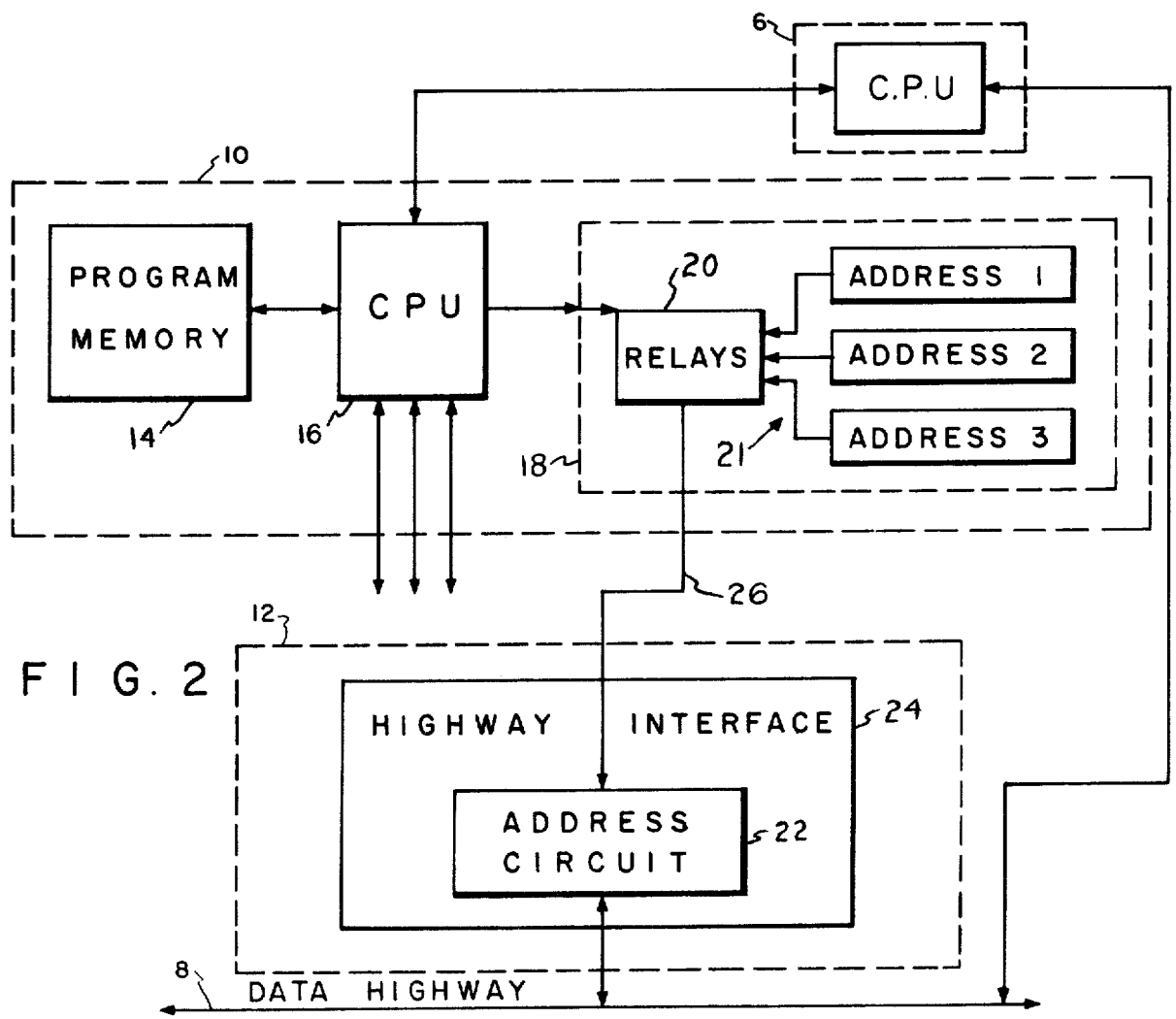
FIG. 2 is a block diagram of a backup director and backup controller arrangement suitable for use in the process control system shown in FIG. 1.

In FIG. 2, there is shown a block diagram for a backup director 10 and a backup controller 12 suitable for use in the process control system shown in FIG. 1. Since the process controllers 2, 4, and 6 each include a digital processor arranged to execute stored programs from a processor memory, e.g., a read-only memory (ROM) the stored program is arranged to produce periodically a so-called watchdog-timer signal indicative of the execution of the stored program. The presence of the watchdog-timer signal is an indication of the continued proper operation of the process controller and may be achieved by any well-known conventional software, i.e., computer program, technique. The watchdog-timer signals from each of the primary process controllers 2, 4, and 6 are applied to the backup director 10 to be sequentially monitored as a means for detecting a failure in the operation of the primary controllers 2, 4, and 6.

When the backup director 10 detects a missing watch dog-timer signal indicative of a failure in a primary process controller 2, 4, or 6, it executes program instructions stored in its program memory 14. The stored program in the program memory 14 directs a digital data processor (CPU 16) within the backup director 10 to produce output signals which are applied to a switching array 18 to operate the relays 20. The relays 20, which may be solid state switch devices, are used to transfer a failed controller address from a selected one of a plurality of address storage devices 21 to the address circuit 22 of a highway interface 24 in the backup controller 12. The transfer of this failed controller highway address into the address circuit 22 of the backup controller 12 enables the backup controller 12 to assume the address of the failed controller. Further, the relays 20 are used to control the enabling of the highway interface circuit 24 in the backup controller 12 and in the failed controller whereby the highway interface of the failed controller is disabled to effectively disconnect the failed controller from the data highway 8 while the highway interface of the backup controller 12 is enabled to effectively connect the backup controller 12 to the data highway 8. Thus, the failed controller is prevented from erroneously responding to its address on the data highway 8 and interferring with the substitute operation of the backup controller 12. Finally, the relays 20 are used to disconnect the process inputs and controller outputs from the failed controller and to provide connections thereto from the backup controller 12 whereby the backup controller 12 receives the same input signals and controls the same process devices as the failed controller.

The highway address storage devices 21 are sets of jumper arrays which are each manually preset to the highway address of respective ones of the primary controllers 2, 4, and 6. Thus, the connection of a jumper array by the relays 20 to the address circuit 22 of the backup controller 12 is effective to provide the address stored in the address storage device selected by the relays 20 to the backup controller 12. Accordingly, the backup controller 12 has available to it an address corresponding to each of the primary controllers 2, 4, and 6 which address can be transferred into the address circuit 22 of the backup controller 12 by a suitable operation of the relays, or switches, 20.

Specifically, the watchdog-timer signal output lines from the primary process controllers 2, 4, and 6 are dedicated signal lines which are each normally in a low signal state condition representative of the proper operation of respective ones of the primary controllers 2, 4, and 6. These lines are successively scanned by the backup director 10 using addresses generated by the processor 16 of the backup director 10 to sequentially address each of the dedicated lines. If an addressed timer signal output line is detected to have a high level signal, this signal level is indicative of a failure of the process controller being monitored, or sensed, by the particular address being used at the time by the processor of the backup director 10. The sensing of a failure of a primary controller 2, 4, and 6 is effective to switch, or branch, the stored program operation of the backup director 10 to a stored program for controlling the substitution of the backup controller 12 for the failed controller. The backup director 10 under the control of the substitute program addresses the relays 20 in the backup director 10 to perform the controller address switching operation. Since the failed primary controller is identified by failure sensing sequence, the relays 20 are operated to select the corresponding controller address from the address memory 21. Thus, the address of the failed processor is transferred from the address storage 21 by the relay switching and used to identify the backup controller to the data highway 8. In achieving the addresses substitution from the failed controller to the backup controller 12, the relays 20 and the address memory 21 perform the function ordinarily effected by electrical circuit jumpers on the highway interface card found in the process controller 2, 4, and 6. Thus, the backup controller 12 has the jumpers replaced by the selectively operable relays 20 and the address memory 21 which are connected to the highway interface card 24 by a multi-conductor cable 26. However, the operation of the relays 20 and the address memory 21 is controlled by an address from the digital processor 16 generated by the program stored in the memory 14 in the backup director 10 to introduce a unique highway address into the backup controller 12.

Other ones of the relays 20 are operated by the address from the processor 16 in the backup director 10 to enable the highway interface 24 of the backup controller 12 and to disable the highway interface card for the failed controller by interfering with the logical operation thereof. The process inputs to the backup controller 12 are switched from the failed controller in the preferred embodiment since one backup controller is available for a plurality of primary controllers and the process control outputs (not shown) of the failed controller are switched to the backup controller 12 enabling the output of the backup controller 12 with a concurrent disabling of the output of the failed primary controller. The relays 20 can also be used to provide additional functions such as lighting an alarm signal to indicate to an operator that a backup controller has been substituted for a failed controller. Such an alarm indication would enable an operator to either repair or replace the failed controller and to return the control of the process to the repaired or replaced primary controller.

Since the failed controller is replaced by a controller having the same highway address, the address circuit of the backup controller 12 can be disabled by the operator by manually deenergizing the relays 20 to remove the highway address from the backup controller 12 and to transfer the process inputs and outputs to the repaired or replaced process controller. It should be noted that such a restoration operation may be achieved by digital control signals supplied over the data highway 8 from a central control room since the backup director 10 is connected to the data highway 8 to respond to supervisory signals obtained therefrom. The overall operation of the process control system is obviously unaffected by the aforesaid controller substitution which maintains the proper functioning of the corresponding industrial process. While the embodiment of the invention shown in FIGS. 1 and 2 is illustrated with three primary controllers, it is obvious that such a monitoring and address transfer operation could be used for a number of controllers either greater, e.g., eight, or less than three, e.g., one. The address memory 21 would, of course, be altered to accommodate the number of addresses to be stored in the actual process control system.

Accordingly, it may be seen that there has been provided, in accordance with the present invention, a process control system having a backup process controller arranged to be substituted for a failed process controller.

The embodiments of the invention in which an exclusive property or privilege is claimed are defined as follows:

1. A process control system comprising;
a data highway,
at least one primary process controller, said controller having a highway address means connected to said data highway,
a backup controller, said backup controller having a highway address means connected to said data highway, and
a backup director connected to said primary controller and said backup controller and including control means responsive to a failure of said primary controller for substituting a data highway address of said primary controller into said highway address means of backup controller.

2. A process control system as set forth in claim 1 and further including disabling means responsive to said control means for disabling said highway address means of said primary controller upon the detection of a failure of said primary controller.

3. A process control system as set forth in claim 1 wherein said backup director includes a highway address memory means for storing a data highway address of said primary process controller and a switching means for connecting said memory means to said backup controller address means upon the detection of a failure of said primary controller by said backup director.

4. A process control system as set forth in claim 3 wherein said backup director includes a program memory means for storing a program for operating said control means upon the detection of a failure of said primary controller.

5. A process control system comprising
a data highway,
a plurality of primary process controllers, said controllers each having a highway address means connected to said data highway,
a backup controller having a highway address means connected to said data highway and
a backup director connected to said primary controller and said backup controllers and including control means responsive to a failure of one of said primary controllers for substituting a data highway address of the failed one of said primary controllers into said backup controller highway address means to enable said backup controller to respond to the substituted data highway address.

6. A process control system as set forth in claim 5 wherein said backup director includes a highway address memory means for storing a data highway address of each of said primary process controllers and a switching means for connecting a stored data highway address of the failed one of said primary process controllers to said highway address means of said backup controller upon the detection of a failure of said primary controller by said backup director.

7. A process control system as set forth in claim 6 wherein said backup director further includes disabling means responsive to said control means for disabling said highway address means of the failed one of said primary controllers.

8. A method of substituting a backup controller for a failed primary controller on a data highway comprising the steps of detecting the failure of a primary controller, substituting the data highway address of the failed controller into the backup controller and concurrently disabling a highway address circuit of said primary controller.

9. A method as set forth in claim 8 and including the further steps of removing the data highway address of the failed controller from the backup controller and reenabling the highway address circuit of the failed controller following a repair of the failed controller.

* * * * *